G. E. HINSON.
TIRE ARMOR.
APPLICATION FILED NOV. 6, 1912.
1,071,741. Patented Sept. 2, 1913.
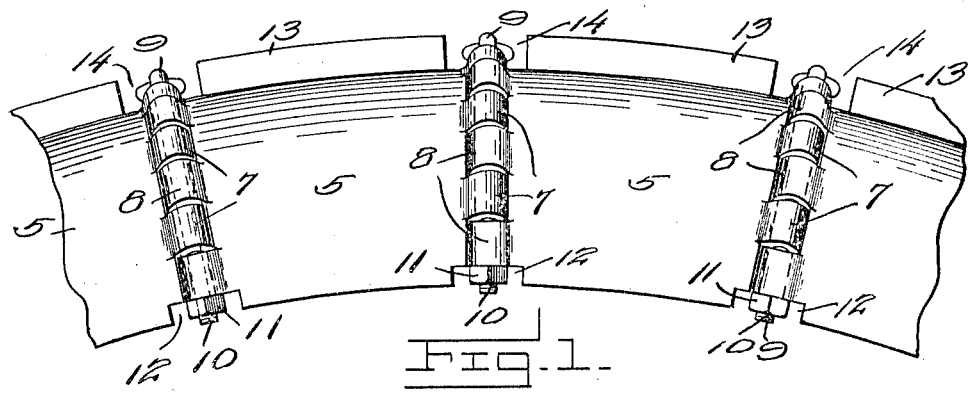
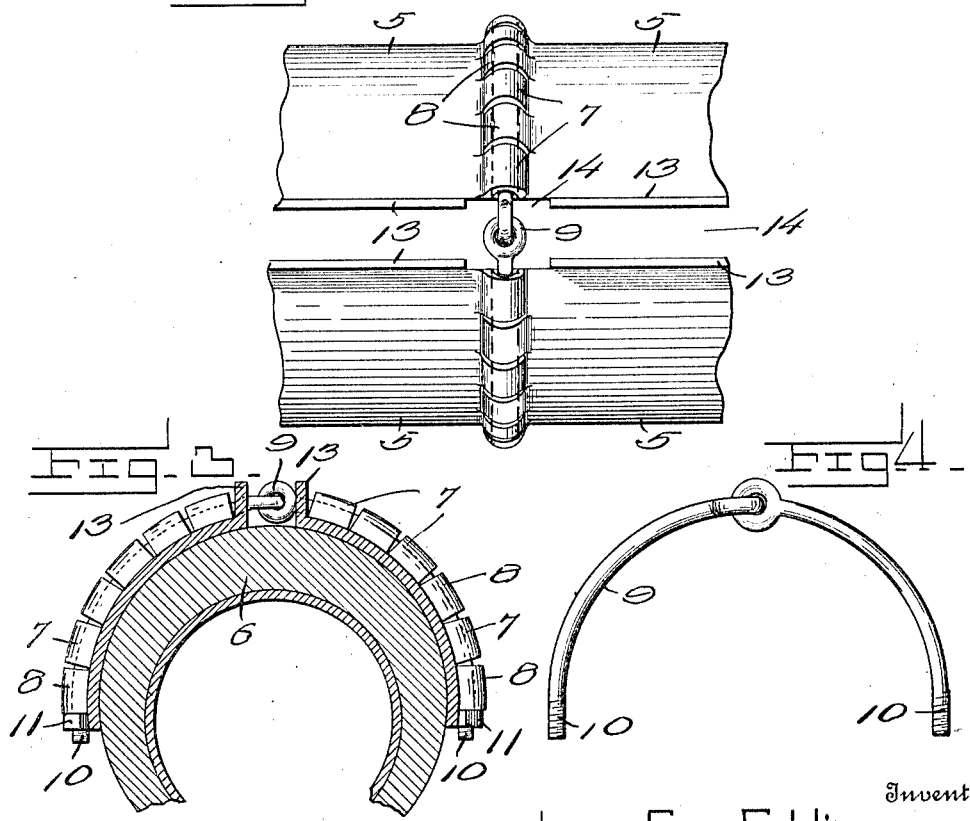
Inventor
Geo. E. Hinson.
Witnesses
By C. L. Parker,
Attorney

UNITED STATES PATENT OFFICE.

GEORGE EDWARD HINSON, OF ATLANTA, GEORGIA.

TIRE-ARMOR.

1,071,741. Specification of Letters Patent. Patented Sept. 2, 1913.

Application filed November 6, 1912. Serial No. 729,801.

*To all whom it may concern:*

Be it known that I, GEORGE E. HINSON, a citizen of the United States, residing at Atlanta, in the county of Fulton and State of Georgia, have invented certain new and useful Improvements in Tire-Armor, of which the following is a specification.

My invention relates to tire armors and has particular reference to a metallic tire armor to be placed upon a pneumatic tire for protecting the same from injury and also serving as means for preventing the wheel from slipping or skidding.

An important object of this invention is to provide a tire armor of the above mentioned character, formed of a plurality of metallic plates connected in a novel manner so that the armor will possess a desired degree of strength and flexibility and will not perceptibly effect the resiliency of the pneumatic tire.

A further object of the invention is to provide a tire armor of the above mentioned character which is simple in construction, strong, durable and cheap to manufacture.

Other objects and advantages of the invention will be apparent during the course of the following description.

In the accompanying drawings forming a part of this specification and in which like numerals are employed to designate like parts throughout the same, Figure 1 is a side view of a portion of my improved tire armor, Fig. 2 is a plan view of the same, Fig. 3 is a transverse sectional view through the same showing it applied to a pneumatic tire, Fig. 4 is a side view of a pair of the connecting bolts or elements, and, Fig. 5 is a longitudinal section through one of the armor plates.

In the drawings wherein for the purpose of illustration I have shown a preferred embodiment of my invention, the numeral 5 designates metallic plates which are formed curved in cross-section to correspond to the curvature of a pneumatic tire 6, upon which the same are arranged, as shown. These plates 5 are disposed in two oppositely arranged annular sets and also form transverse pairs, as shown. Each plate 5 is provided at one end with suitably spaced knuckles 7, which are closed or formed solid, as shown. These knuckles are preferably cast integral with the plate 5. A particular advantage is gained by forming the knuckles closed or solid, as by this construction they may be made sufficiently strong to withstand the wear to which they would naturally be subjected. At the opposite end of each plate 5 are formed suitably spaced knuckles 8, which are closed or solid and preferably cast integral with the plate 5, as shown. The knuckles on one plate 5 fit between the knuckles of the adjacent plate 5, as shown.

The numeral 9 designates longitudinally curved eye bolts, having their heads interfitting or pivotally connected, as shown. These curved eye bolts extend through the interfitting knuckles of the plates 5 and serve to pivotally connect them. The curved eye bolts 9 have their free ends screw-threaded, as shown at 10, by receiving nuts 11, as shown. The plates 5 are cut away adjacent their knuckles, for providing spaces 12 for receiving the nuts 11. It is to be understood that the openings formed through the knuckles 7 and 8 are considerably larger in diameter than the curved eye bolts 9, thus allowing the adjacent plates 5 to partake of a restricted relative swinging movement.

Each plate 5 is provided upon its longitudinal outer edge with an outwardly extending flange or rib 13, which is shorter in longitudinal length than the plate 5. These longitudinal flanges provide spaces 14 for receiving the heads of the curved eye bolts 9. The function of these longitudinal flanges is to protect the heads of the eye bolts 9 and also to prevent the wheel from skidding or slipping laterally.

The knuckles 7 and 8 serve to prevent the wheel from rotary slipping.

The different parts of the armor may be readily separated and assembled for the purpose of applying the device on the tire.

It is to be understood that the form of my invention herewith shown and described is to be taken as a preferred example of the same and that certain changes in the shape, size and arrangement of parts may be resorted to without departing from the spirit of the invention or the scope of the subjoined claims.

Having fully described my invention what I claim is:—

1. A tire armor of the character described, comprising a plurality of transverse pairs of tread plates formed curved in cross-section and provided upon their outermost longitudinal edges with outwardly extending flanges to prevent skidding, said tread plates being provided near their ends with outwardly extending interfitting knuckles which serve as means for preventing the wheel from rotary slipping, and curved eyebolts having their heads pivotally connected and the body portions thereof extending through the interfitting knuckles.

2. A tire armor of the character described, comprising a plurality of transverse pairs of tread plates formed curved in cross-section to conform to the curvature of the tire, the tread plates in each pair being free from connection at their outer adjacent ends, pivot elements connected with the ends of the tread plates, and pairs of bolts having their heads pivotally connected and their body portions extending through the pivot elements to connect the same, said pairs of bolts also serving to flexibly connect the tread plates in each pair.

In testimony whereof I affix my signature in presence of two witnesses.

GEORGE EDWARD HINSON.

Witnesses:
A. H. TURNER,
CELESTA E. JESSAU.

Copies of this patent may be obtained for five cents each, by addressing the "Commissioner of Patents. Washington, D. C."